United States Patent
Cyrot et al.

(10) Patent No.: US 11,067,141 B2
(45) Date of Patent: Jul. 20, 2021

(54) DUST COLLECTOR FOR MULTI-DISK BRAKE

(71) Applicant: Parker-Hannifin Corporation, Cleveland, OH (US)

(72) Inventors: Luc P. Cyrot, Mission Viejo, CA (US); Jon Dustin Hitt, Yorba Linda, CA (US); Edward Hyrlik, Mission Viejo, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 114 days.

(21) Appl. No.: 16/519,486

(22) Filed: Jul. 23, 2019

(65) Prior Publication Data

US 2020/0063809 A1 Feb. 27, 2020

Related U.S. Application Data

(60) Provisional application No. 62/720,189, filed on Aug. 21, 2018.

(51) Int. Cl.

| | |
|---|---|
| *F16D 65/00* | (2006.01) |
| *F16D 55/24* | (2006.01) |
| *F16D 59/02* | (2006.01) |
| *F16D 55/00* | (2006.01) |

(52) U.S. Cl.
CPC ......... *F16D 65/0031* (2013.01); *F16D 55/24* (2013.01); *F16D 59/02* (2013.01); *F16D 2055/0037* (2013.01)

(58) Field of Classification Search
CPC .................................................. F16D 65/0031
See application file for complete search history.

(56) References Cited

U.S. PATENT DOCUMENTS

| | | | | |
|---|---|---|---|---|
| 4,396,101 A | * | 8/1983 | Black ................... | F16D 25/0638 192/85.38 |
| 4,424,887 A | | 1/1984 | Sommer | |
| 5,035,304 A | | 7/1991 | Bösch | |

(Continued)

FOREIGN PATENT DOCUMENTS

| | | | | |
|---|---|---|---|---|
| GB | 2533476 | | 6/2016 | |
| JP | 07012154 A | * | 1/1995 | ......... F16D 65/0031 |

OTHER PUBLICATIONS

Machine translation of JP 07-012154 (no date).*

*Primary Examiner* — Nicholas J Lane
(74) *Attorney, Agent, or Firm* — Renner, Otto, Boisselle & Sklar, LLP

(57) ABSTRACT

A multi-disk brake assembly includes a static structure defining a plurality of slots, a plurality of disks including stator disks that are supported by the static structure and are non-rotatable, and rotor disks that are interleaved with the stator disks and are rotatable, the plurality of disks being axially moveable between an engaged position and a disengaged position, and a dust-collecting receptacle that is attachable to the static structure for securement during an operative state of the multi-disk brake assembly. The dust-collecting receptacle is in fluid communication with the plurality of slots for receiving and trapping dust from the plurality of disks through the plurality of slots. The dust-collecting receptacle is detachable relative to the static structure during a non-operative state of the multi-disk brake assembly.

20 Claims, 1 Drawing Sheet

(56) References Cited

U.S. PATENT DOCUMENTS

| | | | |
|---|---|---|---|
| 5,920,136 A * | 7/1999 | Schmid | A61G 5/04 |
| | | | 180/65.51 |
| 8,701,844 B2 | 4/2014 | Tsiberidis | |
| 2011/0214568 A1 | 9/2011 | Krantz | |
| 2014/0054121 A1 * | 2/2014 | Hummel | F16D 65/0031 |
| | | | 188/218 A |
| 2017/0321770 A1 * | 11/2017 | Cyrot | F16D 65/62 |
| 2018/0031059 A1 * | 2/2018 | Gelb | F16D 65/0031 |
| 2020/0189729 A1 * | 6/2020 | Heid | F16D 55/36 |

* cited by examiner

DUST COLLECTOR FOR MULTI-DISK BRAKE

FIELD OF INVENTION

The present invention relates generally to a dust collector for a multi-disk brake assembly, and more particularly to a dust collector for a multi-disk brake assembly arranged in a rotor of an in-wheel electric motor in a vehicle.

BACKGROUND OF THE INVENTION

Multi-disk brakes are generally implemented when installation of a brake assembly precludes the use of disks with sufficiently large diameters. A multi-disk brake may be suitable for use in various types of large vehicles, such as in trucks or military vehicles. Military vehicles may use in-wheel electric motors rather than a centrally mounted electric motor and transmission. Arranging electric motors in the wheels eliminates the need for additional components such as drive shafts and axles. Eliminating these components is particularly advantageous in that the components may become harmful projectiles when subject to certain environmental conditions during normal operation of the military vehicle.

The multi-disk brake is configured to brake the electrical motor and thus also must be accommodated within the tire profile of the vehicle wheel. In operation, multi-disk brakes include a disk stack having loose spinning disks, or rotor disks, and stationary disks. The disks are engaged with one another when the brake is actuated and are released from engagement when the brake is released. Normal operation of the multi-disk brake may result in dust due to wearing of the disks. Consequently, a build-up of dust may occur on the rotor of the motor causing an unbalance of the rotor during rotation of the rotor.

SUMMARY OF THE INVENTION

The present application is directed towards a multi-disk brake assembly that may be implemented in a large vehicle such as a truck or military vehicle. The described multi-disk brake is particularly suitable for electric motors that are implemented in the wheels of the vehicle. The present multi-disk brake advantageously includes a removable dust-collecting receptacle that enables the dust formed during normal operation of the brake to be collected and trapped within the receptacle such that the dust is isolated from the rotor of the motor and does not build up on the rotor.

The multi-disk brake includes a plurality of stator disks and rotor disks that are interleaved with each other and axially moveable between an engaged position during braking of the electric motor and a disengaged position during non-braking. The disk stack is arranged inside of a rotor of the electric motor which supports the rotor disks for rotation with the rotor. The multi-disk brake includes a static structure or torque tube that is fixed to a stationary housing of the motor, such as a cylindrical hub of the wheel, and supports the stator disks. The static structure extends along the axial length of the disk stack and has a plurality of slots spaced along a top portion of the static structure.

The dust-collecting receptacle is attachable to the static structure and when attached, the dust-collecting receptacle is enclosed by the slotted portion of the static structure. The dust-collecting receptacle extends along the length of the plurality of slots to receive dust from the disk stack through the plurality of slots. During braking, the disk stack will move to the engaged position and dust will form by the contact between the disks. Due to gravity, the dust will fall into the slots. Due to gravity and the force of the vehicle when the vehicle comes to a stop, the dust will fall further into the dust-collecting receptacle in which the dust will be held. When the dust-collecting receptacle is full of dust, the receptacle is removable from the static structure for emptying the receptacle.

According to an aspect of the invention, a multi-disk brake assembly includes a static structure defining a plurality of slots, and a plurality of disks including stator disks that are supported by the static structure and are non-rotatable, and rotor disks that are interleaved with the stator disks and are rotatable. The plurality of disks are axially moveable between an engaged position and a disengaged position. The multi-disk brake assembly includes a dust-collecting receptacle that is attachable to the static structure for securement during an operative state of the multi-disk brake assembly. The dust-collecting receptacle is in fluid communication with the plurality of slots for receiving and trapping dust from the plurality of disks through the plurality of slots, and the dust-collecting receptacle is detachable relative to the static structure during a non-operative state of the multi-disk brake assembly.

According to another aspect of the invention, an electric motor and braking system is arranged in a wheel of an electric vehicle and has an actuated mode of operation and a released mode of operation. The braking system includes a static structure that is fixed to the vehicle and defines a plurality of slots, a rotor that is rotatable relative to the static structure, and a disk stack that is arranged in the rotor and has a stator disk and a rotor disk. The stator disk is non-rotatable and supported by the static structure, and the rotor disk is supported by the rotor for rotation with the rotor and arranged adjacently and coaxially with the stator disk. The stator disk and the rotor disk are axially moveable to engage one another during the actuated mode of operation and disengage from one another during the released mode of operation. The electric motor and braking system includes a dust-collecting receptacle that is attachable to the static structure for securement during an operative state of the vehicle and detachable relative to the static structure during a non-operative state of the vehicle. The static structure is radially arranged between the disk stack and the dust-collecting receptacle, and the dust-collecting receptacle receives and traps dust from the plurality of disks through the plurality of slots.

According to another aspect of the invention, a method of collecting dust may be used for a multi-disk brake assembly arranged in an electric motor. The multi-disk brake assembly includes interleaved rotor disks and stator disks that are axially moveable between an engaged position and a disengaged position. The method includes forming a plurality of slots in a static structure that supports the stator disks, attaching a dust-collecting receptacle to the static structure, receiving and trapping dust from the multi-disk brake assembly in the dust-collecting receptacle through the plurality of slots, and detaching the dust-collecting receptacle from the static structure when the dust-collecting receptacle is filled with dust.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

Figure 1:
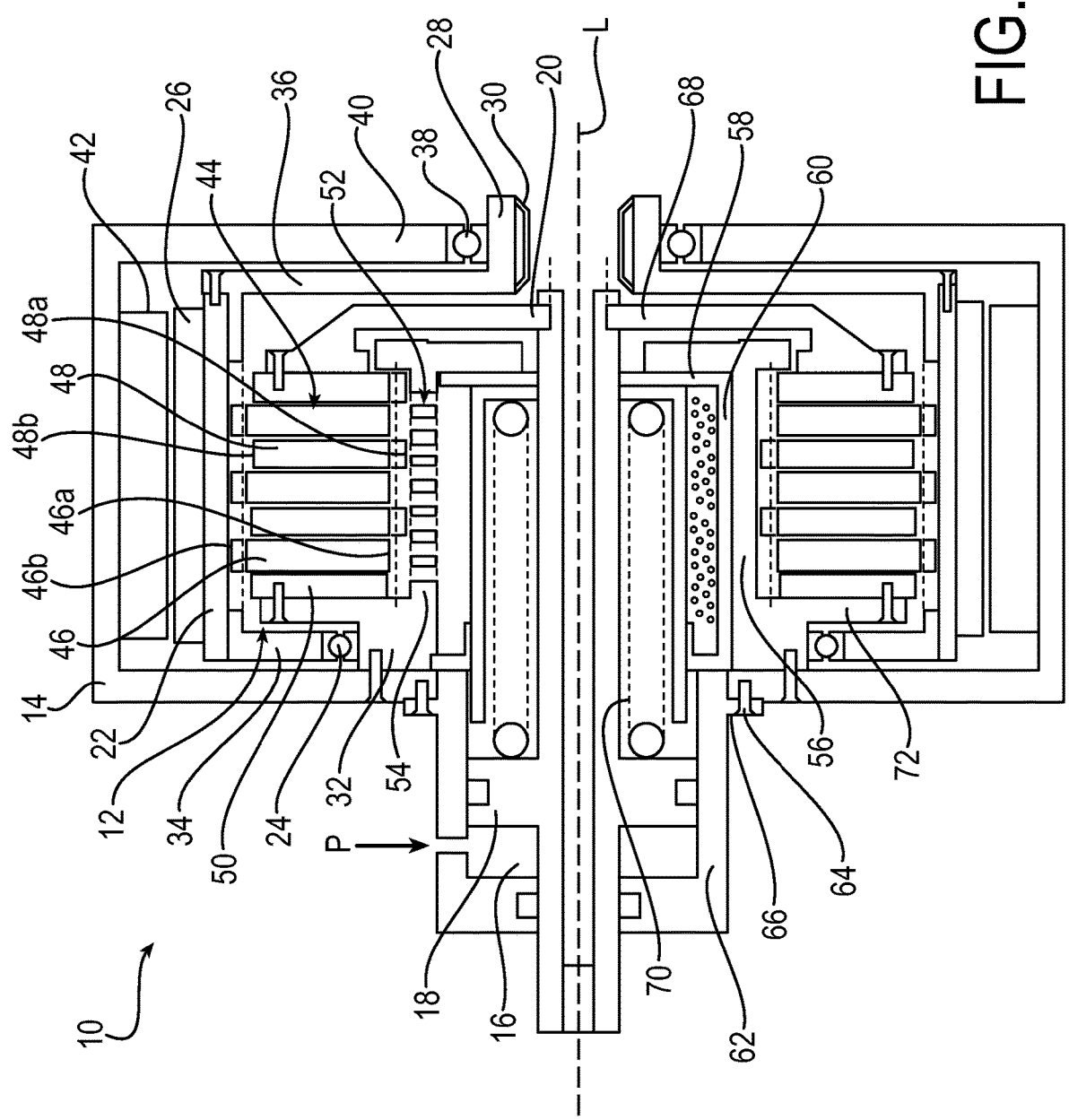
FIG. 1 is a schematic drawing depicting a sectional view of a multi-disk brake assembly according to an embodiment of the invention.

The principles of the present application have particular application in large vehicles such as trucks and military vehicles. A multi-disk brake assembly as described herein is particularly suitable for use in an electric vehicle and even more particularly, in an electric vehicle that has in-wheel electric motors for driving the wheels of the vehicle. The present multi-disk brake includes a removable dust-collecting receptacle that is arranged within the rotor of the electric motor, which collects and retains the dust formed during braking to prevent the dust from building up on the rotor of the electric motor and causing an unbalance of the rotor.

Referring now to FIG. 1, an electric motor and brake system 10 for an electric vehicle is schematically shown. The electric motor and brake system 10 includes a multi-disk type brake assembly 12 having an actuated mode of operation and a released mode of operation. The brake assembly 12 provides a braking function for the electric motor during the actuated mode of operation, and the brake is released to move from the actuated mode of operation to the released mode of operation. As schematically shown in FIG. 1, the electric motor and brake system 10 includes a stationary housing 14 that houses the electric motor and brake system 10. The stationary housing 14 may be a cylindrical hub bolted to the vehicle suspension. The stationary housing will also support the wheel, the wheel bearings and a gear box when necessary. All of the components of the electric motor and brake system 10, the gear box, and the wheel bearings may be radially arranged to fit within the profile of the wheel tire. The stationary housing 14 includes a cylindrical brake chamber 16 that houses a slideable annular piston 18 that has an axially extending piston skirt 20.

The electric motor and brake system 10 includes a rotor 22 that is journaled within the stationary housing 14 via any suitable bearing 24. Rotor laminations 26 are provided to couple the rotor 22 with an output shaft 28 of the electric motor. The rotor laminations 26 may be arranged on a radially outer surface of the rotor 22. The output shaft 28 includes splines 30, and the connection between the rotor 22 and the output shaft 28 of the motor is a splined connection enabling the output shaft 28 to rotate by rotation of the rotor 22. The output shaft 28 is used to directly or through a planetary gear box drive the wheel such that the in-wheel motor system advantageously replaces a transmission, drive shaft, axles, and differentials that are used to drive wheels in conventional vehicles.

The stationary housing 14 includes a static structure 32, such as a bearing carrier or a torque tube, that is secured to the stationary housing 14 and coupled to a first portion 34 of the motor rotor 22. The first portion 34 is located at one axial end of the rotor 22 and the rotor 22 includes a second portion 36 at an opposite axial end of the rotor 22. The second portion 36 is located by a bearing 38 on a fixed portion 40 of the stationary housing 14. The stationary housing 14 further includes a stator portion 42 that is fixed to the stationary housing 14 and arranged radially outwardly relative to the rotor 22 such that the rotor 22 is rotatable relative to the stator portion 42. The static structure 32 is arranged radially inwardly relative to the rotor 22 and the stator portion 42 such that the static structure 32 is arranged within the rotor 22, which is arranged within the stationary housing 14.

The electric motor and brake system 10 includes a brake disk stack 44 that includes a plurality of interleaving rotor disks and stator disks that are keyed to the rotor 22 and the stationary housing 14, respectively. The disk stack 44 is arranged radially inwardly relative to the rotor 22 and the stator portion 42 such that the disk stack 44 is also arranged within the profile of the stationary housing 14. Each of the interleaved rotor and stator disks may have a thickness between three and four millimeters, or any other suitable dimensions as may be warranted for a particular application. The brake disk stack 44 includes at least one rotor disk 46 having an inner diameter 46a and an outer diameter 46b. The rotor disk 46 is supported within the rotor 22 for rotation with the rotor 22. The rotor disk 46 is rotatable about a longitudinal axis L. The rotor disk 46 may be splined such that the rotor disks float on corresponding splines of the rotor 22. The faces of the rotor disk 46 are formed of a friction material, such as a brake pad. Each of the plurality of rotor disks has similar features to the rotor disk 46.

The brake disk stack 44 also includes at least one stator disk 48 that is non-rotatable and arranged along the longitudinal axis L. The stator disk 48 has an inner diameter 48a and an outer diameter 48b and may be formed of a metal. The dimensions of the inner and outer diameters of the rotor disks and the stator disks may vary or may be the same. Another stator disk 50 is an end-most disk of the brake disk stack 44 and coupled with the stationary housing 14 via the static structure 32. The stator disks 48, 50 are supported within the static structure 32 that is fixed to the stationary housing 14. The brake disk stack 44 may include a plurality of stator disks, and each of the plurality of stator disks may have similar features to the stator disk 48. Any suitable number of rotor disks 46 and stator disks 48 may be used. In an exemplary embodiment, the disk stack 44 may include more stator disks 48 than rotor disks 46. The disks may have a predetermined spacing between the disks.

The disks may be arranged such that the outer diameter of one of the rotor disk 46 and the stator disk 48 is farther away from the longitudinal axis L in a first radial direction. For example, as shown in FIG. 1, the outer diameter 46b of the rotor disk 46 is closer to the rotor 22 as compared with the outer diameter 48b of the stator disk 48. The rotor disk 46 and the stator disk 48 are axially moveable along the longitudinal axis L to move between an engaged position where the disks of the disk stack 44 are engaged and braking occurs, and a disengaged position where the disks are spaced and the rotor disks 46 freely rotate during non-braking. The disk stack 44 is in the engaged position during braking of the electric motor and in the disengaged position during normal operation of the vehicle.

The static structure 32 defines a plurality of slots 52 that are spaced relative to each other along an axial length of the static structure 32 and arranged radially inwardly relative to the disk stack 44. The static structure 32 has a slotted portion 54 in which the plurality of slots 52 are formed and a non-slotted portion 56 that radially opposes the slotted portion 54 along the longitudinal axis L. For example, the slotted portion 54 is a top portion of the static structure 32 and the non-slotted portion 56 is a bottom portion of the static structure 32. The plurality of slots 52 are spaced relative to each other, and the spacing between the slots 52 is predetermined. The spacing may be uniform or non-uniform and the axial width of the slots 52 may be uniform or non-uniform. The length of each slot 52 may be parallel relative to the diameter of the disks in the disk stack 44, and the width of each slot 52 may be parallel with the axial spaces between the disks. The length of each slot 52 may extend along the top half of the inner diameter of the disks.

The spacing is determined based on the position of the disks in the disk stack 44 to ensure that the plurality of slots 52 are able to receive dust that falls from between the disks. The dust is formed during braking and engagement between the rotor disks 46 and the stator disks 48. The dust will fall into the slots 52 from the disk stack 44 by way of gravity. The slots 52 may be axially arranged along more than half of an axial length of the disk stack 44 to ensure that dust is captured at every potential build-up location between engaging disks. The slots 52 may be arranged along an entire axial length of the disk stack 44. Some of the slots 52 may be arranged to be offset from being directly and radially inward from the engaging disks to ensure that the dust falls into the slots when the deceleration force of the vehicle may force the dust to fall from the disk stack 44 at an angle instead of directly parallel with the disks.

The electric motor and brake system 10 further includes a dust-collecting receptacle 58 that is attachable to the static structure 32 for securement during an operative state of the vehicle. The dust-collecting receptacle 58 is mounted along the longitudinal axis L and the static structure 32 is radially interposed between the disk stack 44 and an axial portion of the dust-collecting receptacle 58. Thus, the dust-collecting receptacle 58 is arranged within the rotor 22 and contained within the stationary housing 14. When assembled, the dust-collecting receptacle 58 is enclosed by the slotted portion 54 of the static structure 32 and the dust-collecting receptacle 58 is arranged for fluid communication with the plurality of slots 52. The lower or bottom portion 60 of the dust-collecting receptacle 58 radially opposes the slotted portion 54 and is enclosed for trapping the dust when the dust is received in the dust-collecting receptacle 58. By gravity and the force caused by stopping the vehicle, the dust collected in the plurality of slots 52 will fall into the dust-collecting receptacle 58 such that the brake dust will fill the dust-collecting receptacle 58 at every hard stop made by the vehicle. The dust will be collected in the lower or bottom portion 60 of the dust-collecting receptacle 58. The dust will be retained in the bottom portion 60 during normal operation of the vehicle. Thus, the dust is isolated from the rotor 22 and prevented from building up on the rotor.

The dust-collecting receptacle 58 is cylindrical in shape and has an axial length that is greater than an axial length of the slotted portion 54 of the static structure 32 to ensure that each of the plurality of slots 52 is in communication with the dust-collecting receptacle 58. The dust-collecting receptacle 58 is elongated along the longitudinal axis L. The central point of the dust-collecting receptacle 58 may be axially offset or shifted relative to a central point along the slotted portion 54 and the disk stack 44. When the dust-collecting receptacle 58 is full of dust and the vehicle is in a non-operable state, the dust-collecting receptacle 58 is removable relative to the static structure 32 to open the top portion of the dust-collecting receptacle 58 and remove the dust from inside the dust-collecting receptacle 58. The dust-collecting receptacle 58 may be configured to have any suitable volume. In an exemplary embodiment, the dust-collecting receptacle 58 may have a volume to accommodate a build-up of dust for approximately 20,000 miles of operation of the vehicle.

The dust-collecting receptacle 58 may be attachable and removable relative to the stationary housing 14 containing the electric motor and brake assembly 10. The dust-collecting receptacle 58 may be insertable into the stationary housing 14 in an axial direction toward the motor output shaft 28. The dust-collecting receptacle 58 has a cover 62 that holds the dust-collecting receptacle 58 in place against the stationary housing 14. The cover 62 may be secured to the stationary housing 14 via fasteners 64 that extend through a radial shoulder 66 of the cover 62 to secure the radial shoulder 66 against the stationary housing 14. Any suitable fasteners may be used such as bolts, screws, or anchors. When installed or assembled, the dust-collecting receptacle 58 may be rotated to lock the dust-collecting receptacle 58 against a brake loading plate 68 that is coupled to the piston skirt 20 in an axial direction. The brake loading plate 68 is coupled to one of the stator disks 48 for axially moving the coupled stator disk 48 against the rest of the disks in the disk stack 44. In exemplary embodiments, to ease removal, the dust-collecting receptacle 58 may have a press-fit connection or threaded connection with the cover 62 in which the dust-collecting receptacle 58 is inserted. The dust-collecting receptacle 58 may be slidingly inserted into the static structure 32.

In an exemplary embodiment, the multi-disk type brake assembly 12 may be an air braking system that is suitable for parking. The piston 18 is biased to a brake-applying position by a brake spring 70 that is configured to provide enough force to hold the brake assembly 12 in the applied position. If air pressure leaves the brake chamber 16 and an insufficient amount of pressure is available, the brake assembly 12 will automatically be applied by way of the spring force of the brake spring 70. The piston 18 and the piston skirt 20 are biased by the brake spring 70 such that the brake disk stack 44 is compressed by the brake loading plate 68. The disk stack 44 is biased against a radial abutment surface 72 of the static structure 32 that is axially opposite the brake loading plate 68. The radial abutment surface 72 is also axially and radially arranged within the rotor 22. The rotor and stator disks are pressed into frictional engagement to retain the rotor 22 against rotation and brake the motor.

When air pressure builds up in the brake chamber 16, the spring force is overcome and the brake assembly 12 is released. The pressure P may be supplied by any suitable source of hydraulic pressure conventionally utilized in disk braking systems. When the disk stack 44 is released, the disk stack 44 moves to the disengaged position and the rotor disks 46 are freely rotatable during the normal operation of the vehicle. In other exemplary embodiments, the multi-disk type brake assembly 12 may also or alternatively be used for service parking or emergency operation.

For example, in an exemplary embodiment, the brake assembly 12 may be used for service braking and parking. The brake assembly 12 may include both a spring brake chamber and a service brake chamber that are bolted together to form a single unit. The spring brake chamber may be pressurized to release the brake assembly 12 such that the brake assembly 12 is then operable for service braking during normal travel of the vehicle. When the service brake chamber is pressurized for service braking of the electric motor, the piston 18 may be moved and the brake assembly 12 may be compressed for engagement of the disk stack 44.

The multi-disk brake assembly described herein is advantageous in that the assembly is self-contained within the rotor of the electric motor by arranging the components of the brake assembly radially relative to each other. Accordingly, the components of the brake assembly are able to be accommodated within the profile of the tire that houses the in-wheel electric motor in an electric vehicle. Providing the dust-collecting slots in the static structure or torque tube and providing a dust-collecting receptacle is advantageous since dust can be collected and trapped by way of gravity and normal stopping operation of the vehicle that shifts the dust and causes the dust to fall through the slots and into the receptacle. The dust-collecting receptacle accommodates an area within the rotor while also isolating the dust from the rotor. As the profile of the tire is large enough to accommodate the dust-collecting receptacle, the dust-collecting receptacle is formed to have a volume that is large enough to accommodate a substantial amount of dust enabling effective operation of the vehicle for many miles of operation. The dust-collecting receptacle is also advantageously removable relative to the stationary housing so that the dust can be removed and the receptacle can be re-assembled back into the stationary housing.

A multi-disk brake assembly includes a static structure defining a plurality of slots, and a plurality of disks including stator disks that are supported by the static structure and are non-rotatable, and rotor disks that are interleaved with the stator disks and are rotatable. The plurality of disks are axially moveable between an engaged position and a disengaged position. The multi-disk brake assembly includes a dust-collecting receptacle that is attachable to the static structure for securement during an operative state of the multi-disk brake assembly. The dust-collecting receptacle is in fluid communication with the plurality of slots for receiving and trapping dust from the plurality of disks through the plurality of slots, and the dust-collecting receptacle is detachable relative to the static structure during a non-operative state of the multi-disk brake assembly.

Each of the plurality of slots may be spaced apart relative to each other.

Each of the plurality of slots may be non-uniformly spaced apart relative to each other.

The static structure may be radially interposed between the plurality of disks and the dust-collecting receptacle.

The plurality of slots may be axially arranged along more than half of an axial length of the plurality of disks.

The plurality of slots may be axially arranged along the entire axial length of the plurality of disks.

The static structure may have a slotted portion in which the plurality of slots is formed, and a non-slotted portion that radially opposes the slotted portion.

The dust-collecting receptacle may be enclosed by the slotted portion of the static structure when the dust-collecting receptacle is attached to the static structure.

The dust-collecting receptacle may have an axial length that is greater than an axial length of the slotted portion.

The dust-collecting receptacle may be elongated in an axial direction. The dust-collecting receptacle may extend along an axial length of the static structure.

The multi-disk brake assembly may include a brake spring that acts on the plurality of disks to move the plurality of disks into the engaged position.

The multi-disk brake assembly may include a brake loading plate that is arranged axially adjacent the plurality of disks, and the dust-collecting receptacle is engageable against the brake loading plate.

The multi-disk brake assembly may be combined with an electric motor having a rotor and a stator, and the multi-disk brake assembly is arranged inside the rotor.

An electric motor and braking system is arranged in a wheel of an electric vehicle and has an actuated mode of operation and a released mode of operation. The braking system includes a static structure that is fixed to the vehicle and defines a plurality of slots, a rotor that is rotatable relative to the static structure, and a disk stack that is arranged in the rotor and has a stator disk and a rotor disk. The stator disk is non-rotatable and supported by the static structure, and the rotor disk is supported by the rotor for rotation with the rotor and arranged adjacently and coaxially with the stator disk. The stator disk and the rotor disk are axially moveable to engage one another during the actuated mode of operation and disengage from one another during the released mode of operation. The electric motor and braking system includes a dust-collecting receptacle that is attachable to the static structure for securement during an operative state of the vehicle and detachable relative to the static structure during a non-operative state of the vehicle. The static structure is radially arranged between the disk stack and the dust-collecting receptacle, and the dust-collecting receptacle receives and traps dust from the plurality of disks through the plurality of slots.

The electric motor and braking system may further include a stationary housing in which the static structure, the rotor, the disk stack, and the dust-collecting receptacle are arranged, and a stator fixed to the stationary housing and radially interposed between the stationary housing and the rotor. The static structure is fixed to the stationary housing and the rotor is rotatable relative to the stator.

The electric motor and braking system may further include a motor output shaft that is secured to the rotor.

The plurality of slots may be axially arranged along more than half of an axial length of the disk stack.

The plurality of slots may be axially arranged along the entire axial length of the disk stack.

The static structure may have a slotted portion in which the plurality of slots is formed, and a non-slotted portion that radially opposes the slotted portion.

The dust-collecting receptacle may be enclosed by the slotted portion of the static structure when the dust-collecting receptacle is attached to the static structure.

The dust-collecting receptacle may have an axial length that is greater than an axial length of the slotted portion.

The dust-collecting receptacle may be elongated in an axial direction.

The dust-collecting receptacle may extend along an axial length of the static structure.

The electric motor and braking system may include a brake spring that acts on the disk stack.

The electric motor and braking system may include a brake loading plate that is arranged axially adjacent the disk stack, and the dust-collecting receptacle is engageable against the brake loading plate.

A method of collecting dust may be used for a multi-disk brake assembly arranged in an electric motor. The multi-disk brake assembly includes interleaved rotor disks and stator disks that are axially moveable between an engaged position and a disengaged position. The method includes forming a plurality of slots in a static structure that supports the stator disks, attaching a dust-collecting receptacle to the static structure, receiving and trapping dust from the multi-disk brake assembly in the dust-collecting receptacle through the plurality of slots, and detaching the dust-collecting receptacle from the static structure when the dust-collecting receptacle is filled with dust.

The method may further include enclosing the dust-collecting receptacle with the static structure.

The method may further include spacing the plurality of slots.

The method may further include radially arranging the static structure between the multi-disk brake assembly and the dust-collecting receptacle.

The method may further include axially arranging the plurality of slots along an entire axial length of the multi-disk brake assembly.

The method may further include arranging the dust-collecting receptacle along an entire axial length of the plurality of slots.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A multi-disk brake assembly comprising:
   a static structure defining a plurality of slots;
   a plurality of disks including stator disks that are supported by the static structure and are non-rotatable, and rotor disks that are interleaved with the stator disks and are rotatable, the plurality of disks being axially moveable between an engaged position and a disengaged position; and
   a dust-collecting receptacle that is attachable to the static structure for securement during an operative state of the multi-disk brake assembly, wherein the dust-collecting receptacle is in fluid communication with the plurality of slots for receiving and trapping dust from the plurality of disks through the plurality of slots, and wherein the dust-collecting receptacle is detachable relative to the static structure during a non-operative state of the multi-disk brake assembly, wherein the plurality of slots are arranged radially inwardly relative to the plurality of disks.

2. The multi-disk brake assembly of claim 1, wherein the each of the plurality of slots is spaced apart relative to each other.

3. The multi-disk brake assembly of claim 2, wherein each of the plurality of slots is non-uniformly spaced apart relative to each other.

4. The multi-disk brake assembly of claim 1, wherein the static structure is radially interposed between the plurality of disks and the dust-collecting receptacle.

5. The multi-disk brake assembly of claim 1, wherein the plurality of slots is axially arranged along more than half of an axial length of the plurality of disks.

6. The multi-disk brake assembly of claim 5, wherein the plurality of slots is axially arranged along the entire axial length of the plurality of disks.

7. The multi-disk brake assembly of claim 1, wherein the static structure has a slotted portion in which the plurality of slots is formed, and a non-slotted portion that radially opposes the slotted portion.

8. The multi-disk brake assembly of claim 7, wherein the dust-collecting receptacle is enclosed by the slotted portion of the static structure when the dust-collecting receptacle is attached to the static structure.

9. The multi-disk brake assembly of claim 7, wherein the dust-collecting receptacle has an axial length that is greater than an axial length of the slotted portion.

10. The multi-disk brake assembly of claim 1, wherein the dust-collecting receptacle is elongated in an axial direction.

11. The multi-disk brake assembly of claim 1, wherein the dust-collecting receptacle extends along an axial length of the static structure.

12. The multi-disk brake assembly of claim 1 further comprising a brake spring that acts on the plurality of disks to move the plurality of disks into the engaged position.

13. The multi-disk brake assembly of claim 1 further comprising a brake loading plate that is arranged axially adjacent the plurality of disks, wherein the dust-collecting receptacle is engageable against the brake loading plate.

14. The multi-disk brake assembly of claim 1 in combination with an electric motor having a rotor and a stator, the multi-disk brake assembly being arranged inside the rotor.

15. An electric motor and braking system that is arranged in a wheel of an electric vehicle and has an actuated mode of operation and a released mode of operation, the braking system comprising:
   a static structure that is fixed to the vehicle and defines a plurality of slots;
   a rotor that is rotatable relative to the static structure;
   a disk stack arranged in the rotor and having a stator disk and a rotor disk, the stator disk being non-rotatable and supported by the static structure, the rotor disk being supported by the rotor for rotation with the rotor and arranged adjacently and coaxially with the stator disk, the stator disk and the rotor disk being axially moveable to engage one another during the actuated mode of operation and disengage from one another during the released mode of operation; and
   a dust-collecting receptacle that is attachable to the static structure for securement during an operative state of the vehicle and detachable relative to the static structure during a non-operative state of the vehicle,
   wherein the static structure is radially arranged between the disk stack and the dust-collecting receptacle, wherein the plurality of slots are arranged radially inwardly relative to the disk stack, and the dust-collecting receptacle receives and traps dust from the plurality of disks through the plurality of slots.

16. The electric motor and braking system of claim 15 further comprising:
   a stationary housing in which the static structure, the rotor, the disk stack, and the dust-collecting receptacle are arranged, wherein the static structure is fixed to the stationary housing; and
   a stator fixed to the stationary housing and radially interposed between the stationary housing and the rotor, the rotor being rotatable relative to the stator.

17. The electric motor and braking system of claim 15, wherein the plurality of slots is axially arranged along more than half of an axial length of the disk stack.

18. The electric motor and braking system of claim 15, wherein the static structure has a slotted portion in which the plurality of slots is formed, and a non-slotted portion that radially opposes the slotted portion, wherein the dust-collecting receptacle is enclosed by the slotted portion of the static structure when the dust-collecting receptacle is attached to the static structure.

19. The electric motor and braking system of claim 18, wherein the dust-collecting receptacle has an axial length that is greater than an axial length of the slotted portion, and the dust-collecting receptacle is elongated in an axial direction.

20. A multi-disk brake assembly comprising:
a static structure defining a plurality of slots;
a plurality of disks including stator disks that are supported by the static structure and are non-rotatable, and rotor disks that are interleaved with the stator disks and are rotatable, the plurality of disks being axially moveable between an engaged position and a disengaged position; and
a dust-collecting receptacle that is attachable to the static structure for securement during an operative state of the multi-disk brake assembly, wherein the dust-collecting receptacle is in fluid communication with the plurality of slots for receiving and trapping dust from the plurality of disks through the plurality of slots, and wherein the dust-collecting receptacle is detachable relative to the static structure during a non-operative state of the multi-disk brake assembly,
wherein the static structure has a slotted portion in which the plurality of slots is formed, and a non-slotted portion that radially opposes the slotted portion.

* * * * *